(12) United States Patent
Grunwald

(10) Patent No.: US 11,443,871 B2
(45) Date of Patent: Sep. 13, 2022

(54) FIRE RESISTANT AND FOOD SAFE CABLE JACKET AND METHOD

(71) Applicant: LUTZE Inc., Charlotte, NC (US)

(72) Inventor: Stefan Grunwald, Charlotte, NC (US)

(73) Assignee: LUTZE INC., Charlotte, NC (US)

( * ) Notice: Subject to any disclaimer, the term of this patent is extended or adjusted under 35 U.S.C. 154(b) by 0 days.

(21) Appl. No.: 17/156,451

(22) Filed: Jan. 22, 2021

(65) Prior Publication Data
US 2021/0233683 A1 Jul. 29, 2021

Related U.S. Application Data

(60) Provisional application No. 62/993,503, filed on Mar. 23, 2020, provisional application No. 62/964,921, filed on Jan. 23, 2020.

(51) Int. Cl.
*H01B 7/02* (2006.01)
*H01B 7/295* (2006.01)
(Continued)

(52) U.S. Cl.
CPC ............... *H01B 7/295* (2013.01); *C08K 5/56* (2013.01); *C08L 27/06* (2013.01); *H01B 3/441* (2013.01);
(Continued)

(58) Field of Classification Search
CPC .......... H01B 3/441; H01B 7/102; H01B 7/17; H01B 7/183; H01B 7/187; H01B 7/2813;
(Continued)

(56) References Cited

U.S. PATENT DOCUMENTS 3,926,883 A * 12/1975 Touval ................ C08K 3/20
524/405
5,036,121 A * 7/1991 Coaker ................ H01B 3/443
524/100
(Continued)

FOREIGN PATENT DOCUMENTS

EP         3339246 A1    6/2018
WO    2016145690 A1    9/2016
WO    2018069249 A1    4/2018

OTHER PUBLICATIONS

Greiner Environmental, Inc.; "Environmental, Health and Safety Issues in the Coated Wire and Cable Industry," The Massachusetts Toxics Use Reduction Institute, University of Massachusetts Lowell, 2002, pp. 1-60, Technical Report No. 51.
(Continued)

*Primary Examiner* — William H. Mayo, III
(74) *Attorney, Agent, or Firm* — Christopher J. Knors; Moore & Van Allen PLLC

(57) ABSTRACT

An electrical cable is provided. The electrical cable includes at least one conductor having primary insulation; and an outer jacket covering at least a portion of the at least one conductor, the outer jacket comprising at least one flame retardant. The at least one flame retardant is present in an amount capable of retarding flame propagation in accordance with UL 1581 or IEC 60332 and is essentially devoid of chromium, lead, arsenic, mercury, cadmium, antimony, or their compounds; brominated inorganic compounds; and brominated organic compounds. The outer jacket meets FDA 21 CFR Food Contact compliance or Regulation (EU) No. 10/2011 requirements. A method of imparting both flame retardancy and food contact compliance to an electrical cable is also provided.

24 Claims, 2 Drawing Sheets

(51) Int. Cl.
*H01B 7/28* (2006.01)
*H01B 3/44* (2006.01)
*C08K 5/56* (2006.01)
*H01B 7/18* (2006.01)
*C08L 27/06* (2006.01)

(52) U.S. Cl.
CPC .......... *H01B 7/187* (2013.01); *H01B 7/2813* (2013.01); *C08L 2201/02* (2013.01); *C08L 2203/202* (2013.01)

(58) Field of Classification Search
CPC .......... H01B 7/29; H01B 7/292; H01B 7/295; H01B 11/002; H01B 11/02
USPC ....... 174/110 R, 110 PM–110 N, 116, 113 R, 174/119 R, 120 R, 121 A
See application file for complete search history.

(56) References Cited

U.S. PATENT DOCUMENTS

| | | | |
|---|---|---|---|
| 5,104,735 A | * | 4/1992 | Cioffi .................. C08K 3/34 174/11 OAR |
| 5,378,856 A | | 1/1995 | Allen |
| 5,958,117 A | | 9/1999 | Crouch et al. |
| 6,686,537 B1 | | 2/2004 | Gareis et al. |
| 9,259,096 B2 | | 2/2016 | Cik |
| 9,995,899 B2 | | 6/2018 | Boxer et al. |
| 2002/0117325 A1 | * | 8/2002 | Mennone ............... H01B 7/295 174/121 A |
| 2015/0221416 A1 | | 8/2015 | Schad et al. |
| 2018/0194915 A1 | * | 7/2018 | Glew .................... C08L 101/00 |
| 2018/0247738 A1 | * | 8/2018 | Kibe ..................... H01B 3/441 |
| 2018/0355250 A1 | | 12/2018 | Lee et al. |

OTHER PUBLICATIONS

Hobbs, Christopher E.; "Recent Advances in Bio-Based Flame Retardant Additives for Synthetic Polymeric Materials," Polymers, 2019, pp. 1-31, vol. 11.

Helukabel Gmbh; "Ecolab-tested cable insulation for wash-down applications: Food should remain pure and clean," Press Release, 2014, pp. 1-3.

* cited by examiner

FIRE RESISTANT AND FOOD SAFE CABLE JACKET AND METHOD

CROSS-REFERENCE TO RELATED APPLICATIONS

This claims the benefit of U.S. Provisional Application No. 62/993,503 filed on Mar. 23, 2020, and U.S. Provisional Application No. 62/964,921 filed on Jan. 23, 2020, the entirety of each of which is incorporated herein by reference.

TECHNICAL FIELD

The present disclosure relates to an electrical cable that meets both U.S. Food and Drug Administration (FDA 21 CFR) food contact compliance, Underwriters Laboratories (UL 1581) certification and/or National Fire Safety (NSF 51) standards.

BACKGROUND

The standards to be met by electrical machines and components used in the food processing industry are far more stringent than those in traditional facilities. To protect food quality, all electrical cabling and components should be resistant to chemical attack, thermal and physical stresses and not leach chemicals.

To minimize cable-related contamination in food environments, "wash-down" electric cables are used. Wash-down cables are designed to resist soiling using one or more smooth surfaces, no dead space, special coatings and stainless steel coupling components. The wash-down electric cables must be resistant to the many diverse cleaning agents used in the industry. The wash-down cables must withstand high-pressure cleaning with disinfecting chemicals.

The FDA requires that cables used in food production be made of plastics with certain defined characteristics. Cables used in food production must not contain any hazardous substances that could leach out during normal use or after repeated cleaning cycles. On the other hand, plastic cables that are otherwise FDA approved require the addition of flame retardants that render the plastic cables unsuitable for FDA food contact certification.

Most flame-retardant additives (FR's) that could enable certain FDA food grade plastics to meet UL certification result in the plastic failing to meet the stringent FDA requirements, e.g., repeated or constant use/wash in food environments. Thus, FDA-compliant plastics such as polyvinyl chloride (PVC), polypropylene (PP), and cross-linked polyethylene are typically not capable of meeting UL94-V0 certification and end-users must choose between UL certification or FDA compliance for providing power cables to equipment used in the food processing industry.

SUMMARY

In a first example, an electrical cable is provided, the electrical cable comprising: at least one conductor having primary insulation; an outer jacket covering at least a portion of the at least one conductor, the outer jacket comprising at least one flame-retardant; wherein the at least one flame-retardant is present in an amount capable of retarding flame propagation in accordance with UL 1581 or IEC 60332; wherein the outer jacket meets FDA 21 CFR Food Contact compliance or Regulation (EU) No. 10/2011 requirements. In another example, the at least one flame retardant is essentially devoid of chromium, lead, arsenic, mercury, cadmium, antimony or their compounds; brominated inorganic compounds; and brominated organic compounds.

In another example, alone or in combination with any one of the previous examples, the flame retardant is a compound comprising zinc cations (Zn+, Zn++) or zinc anions (Zn−). In another example, alone or in combination with any one of the previous examples, the flame retardant is a zinc salt of an inorganic and/or organic compound. In another example, alone or in combination with any one of the previous examples, the flame retardant is a compound comprising zinc cations (Zn+, Zn++) or zinc anions (Zn−) in combination with one or more zinc oxides or hydroxides. In another example, alone or in combination with any one of the previous examples, the flame retardant is a hydrate compound comprising zinc cations (Zn+, Zn++) or zinc anions (Zn−) that releases its water of hydration at temperatures greater than 500° F. (260° C.).

In another example, alone or in combination with any one of the previous examples, the flame retardant is one or more of zinc 2-ethylhexoate; zinc butyl xanthate; zinc decanoate; zinc neodecanoate; zinc octoate; zinc oleate; zinc palmitate; zinc resinate; zinc ricinoleate; zinc salicylate; zinc dibenzyldithiocarbamate; zinc dibutyldithiocarbamate; zinc diethyldithiocarbamate; zinc dimethyldithiocarbamate; zinc formaldehyde sulfoxylate; zinc isodecanoate; zinc linoleate; zinc 2-mercaptobenzothiazole; zinc naphthenate; zinc naphthenate-dehydroabietylamine mixture; zinc 4-tert-butylthiophenate; zinc hydroxide; zinc oxide; zinc ammonium chloride; zinc nitrate; zinc orthophosphate; zinc silicate; anhydrous zinc sulfate; zinc sulfide; zinc hydroxy phosphite; at least partial sodium zinc salt of poly(ethylene-co-isobutyl acrylate-co-methacrylic acid); at least partial calcium zinc salt of fully dimerized, partially dimerized, or hydrogenated rosin; tin-zinc stearate; calcium zinc stearate; and sodium zinc potassium polyphosphate.

In another example, alone or in combination with any one of the previous examples, the electrical cable further comprises one or more of polydopamine, cyclodextrin, cellulose, gallic acid (3,4,5-trihydroxybenzoic acid), 3,5-dihydroxybenzoic acid, condensed tannin monomer, chemically modified condensed tannin monomer, tannic acid, chemically modified tannic acid, lignin, chemically modified lignin, tannic acid-terephthalate (TAT), tannin-formaldehyde polymers, the reaction product of a polyalkyl diol diglycidyl ether and triethylenetetramine with tannic acid, and mixtures thereof.

In another example, alone or in combination with any one of the previous examples, the electrical cable outer jacket further comprises calcium carbonate, dolmite, talc, mica, silica, kaolin, carbon black, wollostonite, calcium sterate, aluminum hydroxide, alumina trihydrate, magnesium hydroxide, huntite ($Mg_3Ca(CO_3)_4$), hydromagnesite, phosphates, phosphate esters, phosphonates, phosphine oxides, ammonium polyphosphate, modified oligomeric ethyl ethylene phosphate, expandable graphite, and mixtures thereof.

In another example, alone or in combination with any one of the previous examples, the outer jacket is a flexible or resilient material of phthalate free thermoplastic polymer. In another example, alone or in combination with any one of the previous examples, the outer jacket is constructed of polyvinyl chloride (PVC), and the primary insulation is polypropylene, or cross-linked polyethylene. In another example, alone or in combination with any one of the previous examples, the outer jacket is primarily vinyl chloride homo- and/or copolymers (PVC thermoplastic elastomer) plasticized with one or more food safe plasticizers selected from: 1,3-butylene glycoladipic acid polyester;

di(C7, C9-alkyl) adipate; di-n-alkyl adipate; di(2-ethylhexyl) adipate; diisononyl adipate; di(2-ethylhexyl) azelate; di-n-hexylazelate; epoxidized butyl esters of linseed oil fatty acids; epoxidized linseed oil; white mineral oil; hydrogenated polybutene; polyisobutylene; polypropylene glycol; propylene glycol azelate; and triethylene glycol.

In another example, alone or in combination with any one of the previous examples, the electrical cable further comprises EMI or RFI shielding.

In a second example, a method of imparting both flame resistance and FDA food contact compliance to an electrical cable is provided as described in the previous examples, the method comprising providing an electrical cable, the electrical cable comprising at least one conductor having primary insulation; an outer jacket covering at least a portion of the at least one conductor, the outer jacket comprising at least one flame-retardant in an amount capable of retarding flame propagation in accordance with UL 1581 or IEC 60332; one or more additives, the one or more additives being food compliant under FDA 21 CFR Food Contact compliance or Regulation (EU) No. 10/2011 requirements; and imparting flame resistance as determined by UL 1581 or IEC 60332 and food compliant under FDA 21 CFR Food Contact compliance or Regulation (EU) No. 10/2011 requirements.

In another example, alone or in combination with any one of the previous examples, further comprising providing chemically resistance to the electrical cable from cleaning solutions, disinfecting solutions, and sanitizing solutions.

BRIEF DESCRIPTION OF THE DRAWINGS

The present disclosure will now be described by way of example, with reference to the accompanying Figures, of which.

DETAILED DESCRIPTION

Figure 1:
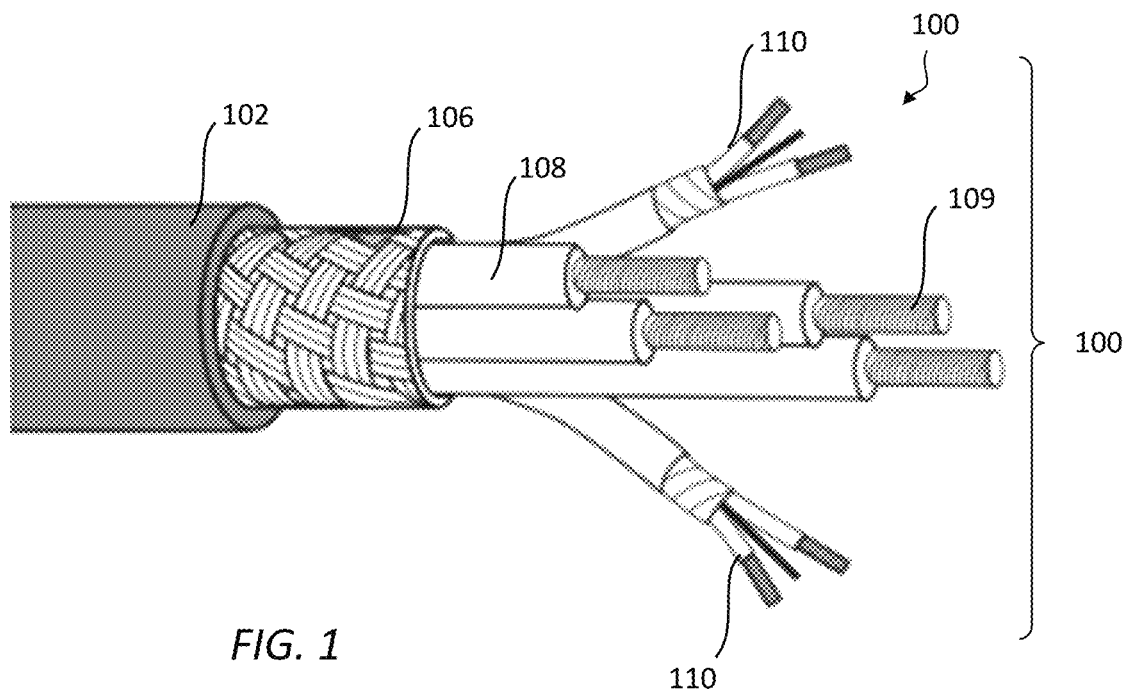
FIG. 1 is a perspective view of an electrical cable as disclosed and described herein.

An electrical cable capable of meeting FDA, UL and/or NSF compliance protocols is provided, the cable comprising an outer jacket insulation comprising at least one flame-retardant. The flame-retardant insulation is present in the insulation covering one or more conductors of the cable, the flame retardant present in an amount sufficient to provide flame retardancy to meet FDA 21 CFR, European Union, UL and/or NSF standards.

The present disclosure now will be described more fully hereinafter with reference to the accompanying drawings, in which illustrative embodiments of the disclosure are shown. Like numbers refer to like elements throughout. In the drawings, the relative sizes of regions or features may be exaggerated for clarity. This disclosure may, however, be embodied in many different forms and should not be construed as limited to the examples or drawings set forth herein; rather, these examples are provided so that this disclosure will be thorough and complete, and will fully convey the scope of the invention to those skilled in the art.

It will be understood that when an element is referred to as being "coupled" or "connected to" or "in contact with" another element, it can be directly coupled or connected to or in contact with the other element or intervening elements can also be present. In contrast, when an element is referred to as being "directly coupled" or "directly connected to" or "directly in contact with" another element, there are no intervening elements present.

As used herein the term "and/or" includes any and all combinations of one or more of the associated listed items. Well-known functions or constructions may not be described in detail for brevity and/or clarity.

As used herein, a conductor is a metal (e.g., copper, aluminum, or alloys thereof) rod or wire that is drawn down to a specified diameter. One or more drawn rods or wires can be bundled and/or twisted together to form the conductor.

As used herein, insulation or "primary insulation" is a non-electrically conductive material that is coated or encased or directly coated or encased on a conductor, the non-electrically conductive material contacting a conductor, or directly contacting a conductor. An example of a non-electrically conductive material is a plastic or rubber. Plastic or rubber can be a thermoplastic or thermoset resin. The plastic or rubber can be one or more polymers, copolymers, or blends thereof.

As used herein, a jacket or an "outer jacket" is secondary insulation, typically a layer of non-electrically conductive material extruded over, extruded directly over, contacting or directly contacting the primary insulation of one or more of a group of conductors, at least some of which have primary insulation. The outer jacket can be the same non-electrically conductive material or can be a different non-electrically conductive material from that of the primary insulation. The outer jacket can contain the same or different additives, FR's, fillers, colorants, etc., as the primary insulation. Sub-jackets can be employed. The outer jacket is exposed to the environment during normal use, including one or more cleaning chemicals.

As used herein, shielding generally includes and refers to materials and structures that provide electromagnetic interference (EMI) shielding and radio frequency interference (RFI) shielding, for example, that prevent (or at least reduce) ingress and egress of EMI and RFI relative to the primary insulation and/or the electronic cable itself and to meet electromagnetic frequency compatibility requirements. Examples of shielding include one or more of metal braided tube, metal foil and/or metalized polymer film, e.g., aluminum coated polyethylene terephthalate (PET) film. In the present disclosure, shielding may be present between the outer jacket and the primary insulation of the conductors.

As used herein, a separator is an optional material partitioned between the shielding and the outer jacket. Examples of a separator include paper. The paper may be impregnated with one or more flame retardants. In the present disclosure, a separator may be present between the outer jacket and the shielding.

As used herein a drain wire is used to refer to a conductor that is electrically connected to a ground shield of the cable. For example, the drain wire is an uninsulated conductor (e.g., a wire) in a cable that is in contact with a shield of the cable, such as a metal foil or braided tube, throughout a major portion of its length. The drain wire directs extraneous signals to ground. In the present disclosure, a drain wire can be present and in electrical contact with the shielding.

In one example, the insulation (primary and/or outer jacket), including major additives such as a food grade additives, where "food grade" or "food safe" additives are one or more materials listed in 21 CFR § 177.1010 thru 21 CFR §§ 177.2000, and 21 CFR § 177.2600, as of the year 2020 in an amount that complies with the regulation. In one example, the insulation (primary and/or outer jacket) is a phthalate free thermoplastic polymer formulated from FDA approved ingredients, components, and/or additives, for example, one or more polyolefin polymers listed in 21 CFR § 177.1520 and/or polyvinyl chloride (PVC) polymers listed in 27 CFR § 177.1950 as of the year 2020. In another example, the outer jacket is primarily PVC thermoplastic elastomer and the primary insulation is one or more polyolefin polymers. In one example, the primary insulation is polypropylene or cross-linked low density polyethylene.

In another example, the outer jacket is primarily vinyl chloride homo- and/or copolymers (PVC thermoplastic elastomer) plasticized with one or more food safe plasticizers selected from: 1,3-butylene glycoladipic acid polyester (1,700-2,200 molecular weight) terminated with about 16 percent by weight mixture of myristic, palmitic, and stearic acids in an amount 33 percent by weight of polyvinyl chloride; di(C7, C9-alkyl) adipate, in which the C7, C9-alkyl groups are derived from linear alpha olefins by the oxo process in an amount 24 percent by weight of vinyl chloride homo- and/or copolymers; di-n-alkyl adipate made from C6, C8-C10 (predominately C8 and C10) or C8-C10 synthetic fatty alcohols in an amount 24 percent by weight of polyvinyl chloride homo- and/or copolymers; di(2-ethylhexyl) adipate; diisononyl adipate; di(2-ethylhexyl) azelate in an amount ≤24 percent by weight of vinyl chloride homo- and/or copolymers; di-n-hexylazelate in an amount ≤15 percent by weight of vinyl chloride homo- and/or copolymers; epoxidized butyl esters of linseed oil fatty acids having an iodine number ≤5 with an oxirane oxygen content of ≥7.8 weight percent; epoxidized linseed oil having an iodine number 5 and an oxirane oxygen content of ≥9 weight percent; white mineral oil; polybutene, hydrogenated (minimum viscosity at ≥99° F., 39 Saybolt Universal Seconds (ASTM methods D445-82 ("Standard Test Method For Kinematic Viscosity Of Transparent And Opaque Liquids (And The Calculation Of Dynamic Viscosity)") and D2161-82 ("Standard Method For Conversion Of Kinematic Viscosity To Saybolt Universal Viscosity Or To Saybolt Furol Viscosity") and bromine number of 3 or less as determined by ASTM Method D1492-78 ("Standard Test Method For Bromine Index Of Aromatic Hydrocarbons By Coulometric Titration"); polyisobutylene (molecular weight of about 300-5,000); polypropylene glycol (Cas Registry No. 25322-69-4) (minimum mean molecular weight of 1,200); propylene glycol azelate (average mol. weight of about 3,000) 41 percent by weight of polyvinyl chloride; and triethylene glycol with diethylene glycol 0.1% by weight; butylbenzyl phthalate.

In one example, the outer jacket is primarily vinyl chloride homo- and/or copolymers (PVC thermoplastic elastomer) plasticized with one or more food safe plasticizers selected from: diisononyl phthalate≤43 percent by weight of vinyl chloride homo- and/or copolymers; dihexyl phthalate; and diphenyl phthalate. In one example, the outer jacket is primarily vinyl chloride homo- and/or copolymers (PVC thermoplastic elastomer) that is essentially free of phthalate plasticizer. In another example, the outer jacket is primarily phthalate free vinyl chloride homo- and/or copolymers of thermoplastic polymer plasticized with FDA approved plasticizers and additives. In another example, the outer jacket is primarily phthalate free FDA approved vinyl chloride homo- and/or copolymers of thermoplastic polymer plasticized entirely with FDA approved plasticizers and additives.

In one example, the flame retardant is one or more compounds capable of formation of a protective char and/or providing termination of free radicals involved in combustion and/or increasing the limiting oxygen index (LOI). In one example, the flame retardant is an organic substance. In another example, the flame retardant is an organic substance in combination with an inorganic substance.

In one example, the at least one flame retardant is devoid of heavy-metals (e.g., chromium, lead, arsenic, mercury, cadmium, antimony), and/or brominated compounds typically used as flame retardants. In one example, the at least one flame retardant is a compound comprising zinc cations (Zn+, Zn++) or zinc anions (Zn−). The zinc compound can be a zinc salt of an inorganic and/or organic compound. In one example, the at least one flame retardant is a compound comprising zinc cations (Zn+, Zn++) or zinc anions (Zn−) in combination with one or more oxides of zinc. In one example, the at least one flame retardant is a hydrate compound comprising zinc cations (Zn+, Zn++) or zinc anions (Zn−) that releases its water of hydration during temperatures that sustain or induce combustion of plastic, e.g., temperatures exceeding 500° F. (260° C.). In one example, the flame retardant is selected from one or more of at least a partial zinc salt of organic compounds selected from: fatty acids (animal or vegetable); soybean oil fatty acids; tall oil fatty acids; ethylene-methacrylic acid copolymer; ethylene-methacrylic acid-vinyl acetate copolymer; petroleum sulfonate; poly(ethylene-co-isobutyl acrylate-co-methacrylic acid); and rosin (gum rosin, tall oil rosin, or wood rosin, fully dimerized, partially dimerized, or hydrogenated).

In other example, the flame retardant is selected from one or more of: zinc 2-ethylhexoate; zinc butyl xanthate; zinc decanoate; zinc neodecanoate; zinc octoate; zinc oleate; zinc palmitate; zinc resinate; zinc ricinoleate; zinc salicylate; zinc dibenzyldithiocarbamate; zinc dibutyldithiocarbamate; zinc diethyldithiocarbamate; zinc dimethyldithiocarbamate; zinc formaldehyde sulfoxylate; zinc isodecanoate; zinc linoleate; zinc 2-mercaptobenzothiazole; zinc naphthenatezinc naphthenate-dehydroabietylamine mixture; and zinc 4-tert-butylthiophenate.

In other example, the flame retardant is selected from one or more of: zinc hydroxide; zinc oxide; zinc ammonium chloride; zinc nitrate; zinc orthophosphate zinc silicate; anhydrous zinc sulfate; zinc sulfide; and zinc hydroxy phosphite. In another example, the flame retardant is selected from one or more of at least a partial sodium zinc salt of poly(ethylene-co-isobutyl acrylate-co-methacrylic acid); at least a partial calcium zinc salt of fully dimerized, partially dimerized, or hydrogenated rosin; tin-zinc stearate; calcium zinc stearate; and sodium zinc potassium polyphosphate.

In one example, the flame retardant (or the outer jacket) further comprises one or more organic materials: polydopamines, cyclodextrins, cellulose, gallic acid (3,4,5-trihydroxybenzoic acid), 3,5-dihydroxybenzoic acid, condensed tannin monomer, chemically modified condensed tannin monomer, tannic acid, chemically modified tannic acid, lignins, and combinations thereof. In one example, the chemically modified tannins include tannic acid-terephthalate (TAT), tannin-formaldehyde polymers, the reaction product of a polyalkyl diol diglycidyl ether and triethylenetetramine with tanninic acid, and mixtures thereof.

In one example, the flame retardant is combined with one or more of the following inorganic materials: calcium carbonate, dolmite, talc, mica, silica, kaolin, carbon black, wollostonite, calcium sterate, aluminum hydroxide, alumina trihydrate, magnesium hydroxide, zinc borate (hydrate or anhydrous), zinc hydroxystannate ($ZnSn(OH)_6$ (hydrate or anhydrous), huntite ($Mg_3Ca(CO_3)_4$, hydromagnesite, phosphates, phosphate esters, phosphonates, phosphine oxides, ammonium polyphosphate, modified oligomeric ethyl ethylene phosphate and, expandable graphite, with the proviso that the amount of inorganic material does not substantially alter or affect compliance under FDA 21 CFR or Regulation (EU) No. 10/2011 requirements and/or the properties of the cable jacket.

FIG. 1 schematically illustrates by way of example an exemplary electrical cable 100 according to the present disclosure. Cable 100 contains a plurality of conductors 109, shown in this instance having a portion of the primary insulation 108 removed. The conductor 109 may be a copper or aluminum (or alloy) rod or wire of a cable assembly, the insulation 108 already having been previously fitted about the conductor.

In the example of FIG. 1, optional braiding 106 in the form of a metal weave is positioned in contact with the primary insulation of the plurality of conductors 109. In one example, braiding 106 is made of, for example, a tin-copper alloy. In one example, optional braiding 106 functions as an EMI shield and/or a RFI shield. In one example, braiding is present in the cable of the present disclosure.

In one example, the braiding 106 is in direct contact with the plurality of insulated conductors 109. In another example, the outer jacket 102 is in direct contact with the braiding 106, and the braiding is in direct contact with the plurality of insulated conductors.

As shown in FIG. 1, outer jacket 102 is constructed in a surrounding relationship about the optional braiding and the plurality of insulated conductors 109, in an electrically insulating manner. Additional groupings of conductors 110 with or without primary insulation and/or shielding are shown, but are optional components of the electrical cable as presently disclosed. The outer jacket 102 completes the electrical cable and encloses the conductors and the insulated conductors.

Figure 2:
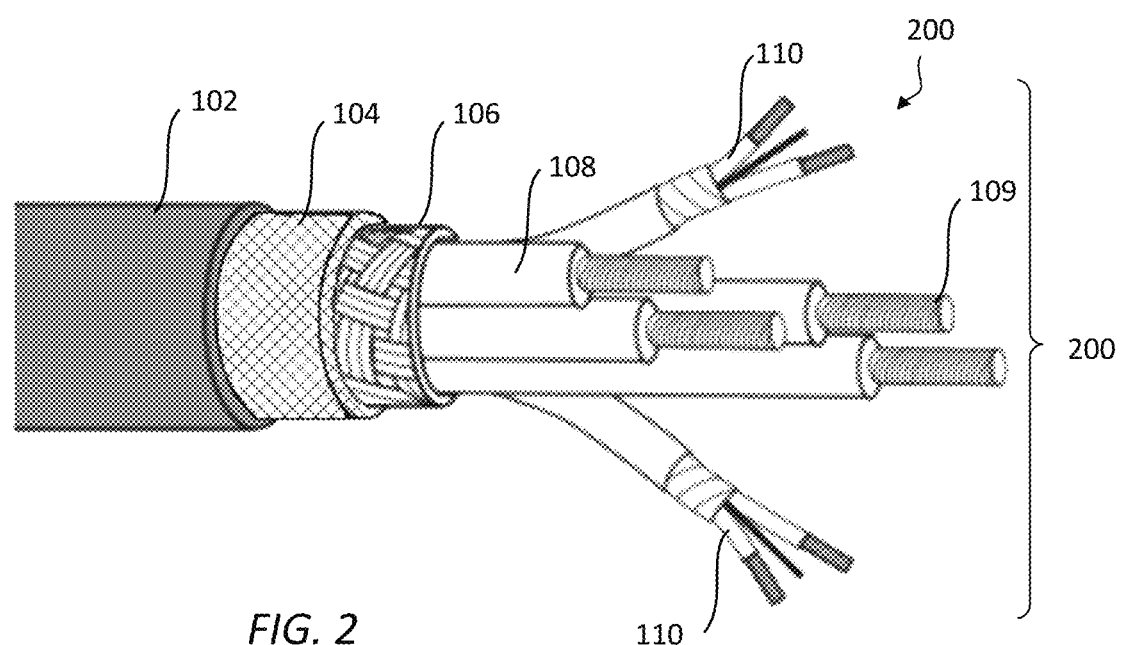
FIG. 2 is a perspective view of an electrical cable as disclosed and described herein.

With reference to FIG. 2, exemplary electrical cable 200 of the present disclosure is shown having a similar arrangement to that of FIG. 1, but with the addition of separator 104 positioned between outer jacket 102 and shielding 106. In one example, the separator 104 is in direct contact with the braiding 106 and the shielding 106.

Figure 3:
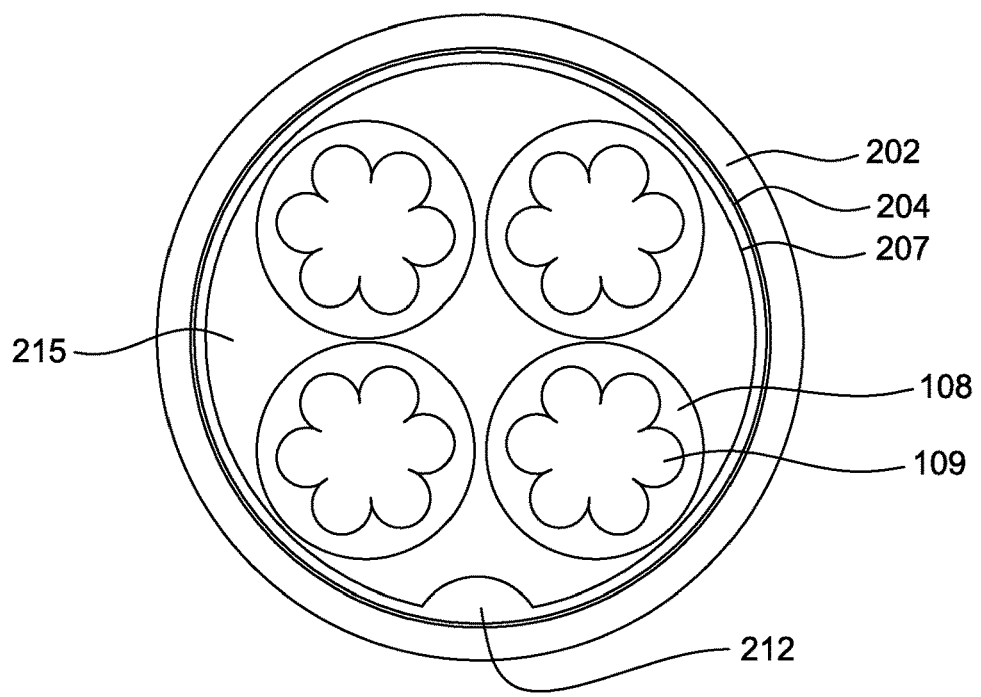
FIG. 3 is a section view of an electrical cable through its longitudinal axis, as disclosed and described herein.

With reference to FIG. 3, a sectional view through the longitudinal axis of an exemplary electrical cable of the present disclosure is shown having, in order from the outside surface to the interior, outer jacket 202, separator 204, shielding 207, optional filler material 215, a plurality of conductors 109 with corresponding primary insulation 108 and drain wire 212. Optional filler material 215 can be the same or different primary insulation, air, or one or more organic or inorganic flame retardant materials, foam, or intumescent.

Figure 4:
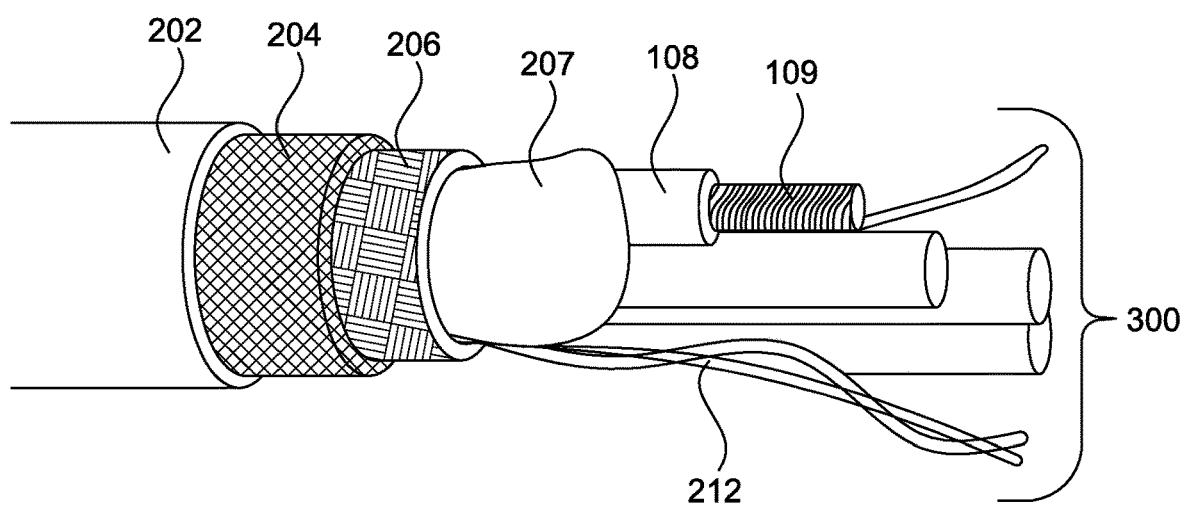
FIG. 4 is a perspective view of an electrical cable as disclosed and described herein.

FIG. 4 shows a perspective view of an exemplary electrical cable 300 having outer jacket 202, separator 204, braided shielding 206 and foil shielding 207, surrounding, and an electrically insulating arrangement, a plurality of conductors 109 with primary insulation 108 and drain wire 212.

In one example, the outer jacket 102 is a thermoplastic elastomer substantially free of phthalates. In another example, the outer jacket 102 is substantially free of silicone resins. In one example, the outer jacket 102 substantially corresponds, in terms of its FR and food contact properties, to that of the primary insulation 108 of the individual conductors. Thus, for example both the outer jacket 102 and primary insulation 108 comprise one or more flame retardants alone or in combination with one or more inorganic flame retardants. In another example, the outer jacket 102 differs in terms of its FR and food contact properties to that of the primary insulation 108 of the individual conductors. Thus, for example, only outer jacket 102 comprises one or more flame retardants alone or in combination with one or more inorganic flame retardants, whereas primary insulation comprises a conventional flame retardant.

Experimental Data

Tables 1-4 presents electrical, mechanical and compliance testing data for an exemplary unshielded electrical cable as disclosed and described herein.

TABLE 1

Construction and Electrical Data of exemplary cables as disclosed and described herein.

| | |
|---|---|
| Operating Voltage U0/U | 1000 V UL |
| Test Voltage | 2000 V |
| Conductor resistance | Per ASTM |
| Insulation Resistance at 20° C. | min. 20 MΩ × km |
| Outer Jacket | extruded PVC comprising zinc-based flame retardant and food grade plasticizer |
| Separator over cable core | Paper tissue (untreated) |
| Sub Jacket | none |
| Overall shielding | none |
| Drain Wire | none |
| Separator over shield | None |

TABLE 2 mechanical Data of exemplary cables as disclosed and described herein.

| | | |
|---|---|---|
| Temperature Range | Moving | −40° C. to +90° C. |
| | Fixed | −40° C. to +90° C. |
| Minimum Bending Radius | Moving | 10 × OD |
| | Fixed | 4 × OD |

TABLE 3

Compliance test Data of exemplary cables as disclosed and described herein.

| | |
|---|---|
| Burning behavior | UL 1581 Cable flame |
| Other compliance | Conforming to RoHS-directive EU2015/863, REACH compliant, free of conflict minerals (compliant with Frank-Dodd act); Meets California Proposition 65 (Safe Drinking Water and Toxic Enforcement Act of 1986); phthalate and silicone free. |
| Other Agency Approvals | FDA Food contact per 21CFR 175.300 |

Tables 4-6 presents electrical, mechanical and compliance testing data for an exemplary dual-shielded (braiding and foil) electrical cable as disclosed and described herein.

TABLE 4

Construction and Electrical Data of exemplary shielded cables as disclosed and described herein.

| | |
|---|---|
| Conductor | Bare copper (Cu ETP 1) per ASTM; Oxygen containing copper (max. 0.04%) with an electrical conductivity in soft state of ≥ 58.58 m/Ωmm2 at 20° C.; 24-2 Section (AWG); 30 Stranding (AWG) |
| Insulation | Polypropylene |
| Cable lay up | Conductors cabled in layers; If fillers are used, they must be extruded of the same material as the insulation. |
| Separator over cable core | Paper tissue (untreated) |
| Sub Jacket | none |
| Overall shielding | Aluminum/Mylar tape, drain wire, tinned copper braid min AWG36 75% braid angle range between 30 and 50° C. |
| Drain Wire | 24-22 AWG Cables = 24AWG 7/32 TC Drain |
| Separator over shield | Paper Tissue |
| Outer Jacket | extruded PVC comprising zinc-based flame retardant and food-grade plasticizer |
| Electrical Data | |
| Operating Voltage U0/U | 1000 V UL |
| Test Voltage | 2000 V |
| Conductor resistance | Per ASTM |
| Insulation Resistance at 20° C. | min. 20 MΩ × km |

TABLE 5

Mechanical Data of exemplary shielded cables as disclosed and described herein.

| Mechanical Data | | |
|---|---|---|
| Temperature Range | Moving | −40° C. to +90° C. |
| | Fixed | −40° C. to +90° C. |
| Minimum Bending Radius | Moving | 10 × OD |
| | Fixed | 4 × OD |

TABLE 6

Compliance Data of exemplary cables as disclosed and described herein.

| Ratings | |
|---|---|
| Burning behavior | UL 1581 Cable flame |
| Other compliance | Cables are conforming to RoHS-directive EU2015/863, REACH compliant, free of conflict minerals (compliant with Frank-Dodd act); meets California Proposition 65 (Safe Drinking Water and Toxic Enforcement Act of 1986); phthalate and silicone free. |
| Other Agency Approvals | FDA Food contact per 21CFR 175.300 |

Tables 7-9 presents electrical, mechanical and compliance testing data for an exemplary shielded multi-conductor VFD electrical cable as disclosed and described herein.

TABLE 7

Construction and Electrical Data of exemplary shielded cables as disclosed and described herein.

| | |
|---|---|
| Conductor | Tinned copper per ASTM;; 18-8 Section (AWG); 30 Stranding (AWG) |
| Insulation | Cross-linked low-density polyethylene |
| Cable lay up | Conductors cabled in layers; Fillers, if used, are extruded of the same material as the insulation. |
| Separator over cable core | None |
| Sub Jacket | none |
| Overall shielding | Foil tape, drain wire, tinned copper braid |
| Drain Wire | Yes |
| Separator over shield | Polyester fleece bonded with jacket |
| Outer Jacket | extruded PVC comprising zinc-based flame retardant and food-grade plasticizer |
| Electrical Data | |
| Operating Voltage U0/U | 1000 V UL |
| Test Voltage | 2000 V |
| Conductor resistance | Per ASTM |
| Insulation Resistance at 20° C. | min. 20 MΩ × km |

TABLE 8

Mechanical Data of exemplary shielded cables as disclosed and described herein.

| | | |
|---|---|---|
| Temperature Range | Moving Fixed | -40° C. to +90° C. |
| Minimum Bending Radius | Moving | |
| | Fixed | 6 × OD |

TABLE 9

Compliance Data of exemplary cables as disclosed and described herein.

| | |
|---|---|
| Burning behavior | UL 1581 Cable flame |
| Oil resistance | Oil Res II |
| Other compliance | Cables are conforming to RoHS-directive EU2015/863, REACH compliant, free of conflict minerals (compliant with Frank-Dodd act); meets California Proposition 65 (Safe Drinking Water and Toxic Enforcement Act of 1986); phthalate and silicone free. |
| Other Agency Approvals | FDA Food contact per 21CFR 175.300 |

Table 10 presents test results in accordance with 21 CFR 175.300 of an exemplary electrical cable having an outer jacket and primary insulation as described in disclosed herein.

TABLE 10

21 CFR 175.300 extraction data for exemplary cable
disclosed and described herein.

| Extraction Solvent | Average Extractives (average of 4 measurements( | Specification (≤18 mg/in.$^2$) Pass/Fail |
|---|---|---|
| Water | 0.063 mg/in.$^2$ | Pass |
| Dane | 0.27 mg/in.$^2$ | Pass |

Thus, the above data demonstrates that the presently disclosed electrical cable construction can advantageously be used with food processing equipment and meets UL 1581 safety requirements.

Outer jacket 102, 202 of the presently disclosed electrical cable examples was tested with multiple conventional cleaning and sanitizing solutions without substantial leaching of toxic or harmful materials, thus, making it acceptable for use around food production equipment.

One of ordinary skill in the art would appreciate that the outer jacket 102, 202 can be rigid, semi-rigid, or flexible in the final assembled state. In addition to the advantages already mentioned, the present disclosure enables simple assembly of the outer jacket 102, e.g., by extrusion coating of a plurality of insulated conductors, with optional shielding and/or separators with molten material constituting the outer jacket having incorporated therein one or more flame retardants or one or more flame retardants in combination with polymers and food grade additives as disclosed and described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. An electrical cable comprising:
    at least one conductor having primary insulation; and
    an outer jacket covering at least a portion of the at least one conductor, the outer jacket comprising at least one flame retardant,
    wherein the at least one flame retardant is present in an amount capable of retarding flame propagation in accordance with UL 1581 or IEC 60332,
    wherein the outer jacket meets FDA 21 CFR Food Contact compliance or Regulation (EU) No. 10/2011 requirements, and
    wherein the at least one flame retardant is essentially devoid of chromium, lead, arsenic, mercury, cadmium, antimony or their compounds; brominated inorganic compounds; and brominated organic compounds.

2. The electrical cable of claim 1, wherein the flame retardant is a compound comprising zinc cations (Zn+, Zn++) or zinc anions (Zn−).

3. The electrical cable of claim 2, wherein the flame retardant is a zinc salt of an inorganic and/or organic compound.

4. The electrical cable of claim 2, wherein the flame retardant is a compound comprising zinc cations (Zn+, Zn++) or zinc anions (Zn−) in combination with one or more zinc oxides or hydroxides.

5. The electrical cable of claim 2, wherein the flame retardant is a hydrate compound comprising zinc cations (Zn+, Zn++) or zinc anions (Zn−) that releases its water of hydration at temperatures greater than 500° F. (260° C.).

6. The electrical cable of claim 2, wherein the flame retardant is one or more of zinc 2-ethylhexoate; zinc butyl xanthate; zinc decanoate; zinc neodecanoate; zinc octoate; zinc oleate; zinc palmitate; zinc resinate; zinc ricinoleate; zinc salicylate; zinc dibenzyldithiocarbamate; zinc dibutyldithiocarbamate; zinc diethyldithiocarbamate; zinc dimethyldithiocarbamate; zinc formaldehyde sulfoxylate; zinc isodecanoate; zinc linoleate; zinc 2-mercaptobenzothiazole; zinc naphthenate; zinc naphthenate-dehydroabietylamine mixture; zinc 4-tert-butylthiophenate; zinc hydroxide; zinc oxide; zinc ammonium chloride; zinc nitrate; zinc orthophosphate; zinc silicate; anhydrous zinc sulfate; zinc sulfide; zinc hydroxy phosphite; at least partial sodium zinc salt of poly(ethylene-co-isobutyl acrylate-co-methacrylic acid); at least partial calcium zinc salt of fully dimerized, partially dimerized, or hydrogenated rosin; tin-zinc stearate; calcium zinc stearate; and sodium zinc potassium polyphosphate.

7. The electrical cable of claim 2, wherein the flame retardant further comprises one or more of calcium carbonate, dolmite, talc, mica, silica, kaolin, carbon black, wollostonite, calcium sterate, aluminum hydroxide, alumina trihydrate, magnesium hydroxide, huntite ($Mg_3Ca(CO_3)_4$), hydromagnesite, phosphates, phosphate esters, phosphonates, phosphine oxides, ammonium polyphosphate, modified oligomeric ethyl ethylene phosphate, and expandable graphite.

8. The electrical cable of claim 2, wherein the flame retardant further comprises one or more of polydopamine, cyclodextrin, cellulose, gallic acid (3,4,5-trihydroxybenzoic acid), 3,5-dihydroxybenzoic acid, condensed tannin monomer, chemically modified condensed tannin monomer, tannic acid, chemically modified tannic acid, lignin, chemically modified lignin, tannic acid-terephthalate (TAT), tannin-formaldehyde polymers, and the reaction product of a polyalkyl diol diglycidyl ether and triethylenetetramine with tannic acid.

9. The electrical cable of claim 1, wherein the outer jacket is a flexible or resilient material of phthalate free thermoplastic polymer.

10. The electrical cable of claim 9, wherein the outer jacket is constructed of polyvinyl chloride (PVC) and the primary insulation is polypropylene or cross-linked polyethylene.

11. The electrical cable of claim 10, wherein the outer jacket is primarily vinyl chloride homo- and/or copolymers (PVC thermoplastic elastomer) plasticized with one or more food safe plasticizers selected from: 1,3-butylene glycoladipic acid polyester; di(C7, C9-alkyl) adipate; di-n-alkyl adipate; di(2-ethylhexyl) adipate; diisononyl adipate; di(2-ethylhexyl) azelate; di-n-hexylazelate; epoxidized butyl esters of linseed oil fatty acids; epoxidized linseed oil; white mineral oil; hydrogenated polybutene; polyisobutylene; polypropylene glycol; propylene glycol azelate; and triethylene glycol; and wherein the vinyl chloride homo- and/or copolymers are devoid of phthalate plasticizer.

12. The electrical cable of claim 1, wherein the electrical cable further comprises EMI or RFI shielding.

13. A method of imparting both flame retardancy and food contact compliance to an electrical cable, the method comprising providing an electrical cable, the electrical cable comprising:

at least one conductor having primary insulation;

an outer jacket covering at least a portion of the at least one conductor, the outer jacket comprising at least one flame retardant in an amount capable of retarding flame propagation in accordance with UL 1581 or IEC 60332; and one or more additives, the one or more additives being food compliant under FDA 21 CFR Food Contact compliance or Regulation (EU) No. 10/2011 requirements.

14. The method of claim 13, wherein the flame retardant is a compound comprising zinc cations (Zn+, Zn++) or zinc anions (Zn−).

15. The method of claim 14, wherein the flame retardant comprises a zinc salt of an inorganic compound or an organic compound.

16. The method of claim 14, wherein the flame retardant is a compound comprising zinc cations (Zn+, Zn++) or zinc anions (Zn−) in combination with one or more zinc oxides or hydroxides.

17. The method of claim 14, wherein the flame retardant is a hydrate compound comprising zinc cations (Zn+, Zn++) or zinc anions (Zn−) that releases its water of hydration at temperatures exceeding 500° F. (260° C.).

18. The method of claim 14, wherein the flame retardant is one or more of zinc 2-ethylhexoate; zinc butyl xanthate; zinc decanoate; zinc neodecanoate; zinc octoate; zinc oleate; zinc palmitate; zinc resinate; zinc ricinoleate; zinc salicylate; zinc dibenzyldithiocarbamate; zinc dibutyldithiocarbamate; zinc diethyldithiocarbamate; zinc dimethyldithiocarbamate; zinc formaldehyde sulfoxylate; zinc isodecanoate; zinc linoleate; zinc 2-mercaptobenzothiazole; zinc naphthenate; zinc naphthenate-dehydroabietylamine mixture; zinc 4-tert-butylthiophenate; zinc hydroxide; zinc oxide; zinc ammonium chloride; zinc nitrate; zinc orthophosphate; zinc silicate; anhydrous zinc sulfate; zinc sulfide; zinc hydroxy phosphite; at least partial sodium zinc salt of poly(ethylene-co-isobutyl acrylate-co-methacrylic acid); at least partial calcium zinc salt of fully dimerized, partially dimerized, or hydrogenated rosin; tin-zinc stearate; calcium zinc stearate; and sodium zinc potassium polyphosphate.

19. The method of claim 14, further comprising one or more of calcium carbonate, dolmite, talc, mica, silica, kaolin, carbon black, wollostonite, calcium sterate, aluminum hydroxide, alumina trihydrate, magnesium hydroxide, huntite ($Mg_3Ca(CO_3)_4$), hydromagnesite, phosphates, phosphate esters, phosphonates, phosphine oxides, ammonium polyphosphate, modified oligomeric ethyl ethylene phosphate, expandable graphite, polydopamine, cyclodextrin, cellulose, gallic acid (3,4,5-trihydroxybenzoic acid), 3,5-dihydroxybenzoic acid, condensed tannin monomer, chemically modified condensed tannin monomer, tannic acid, chemically modified tannic acid, lignin, chemically modified lignin, tannic acid-terephthalate (TAT), tannin-formaldehyde polymers, and the reaction product of a polyalkyl diol diglycidyl ether and triethylenetetramine with tannic acid.

20. The method of claim 13, wherein the outer jacket is a flexible or resilient material.

21. The method of claim 20, wherein the outer jacket is constructed of polyvinyl chloride (PVC) and the primary insulation is polypropylene or cross-linked polyethylene.

22. The method of claim 21, wherein the outer jacket is primarily vinyl chloride homo- and/or copolymers (PVC thermoplastic elastomer) plasticized with one or more food safe plasticizers selected from: 1,3-butylene glycoladipic acid polyester; di(C7, C9-alkyl) adipate; di-n-alkyl adipate; di(2-ethylhexyl) adipate; diisononyl adipate; di(2-ethylhexyl) azelate; di-n-hexylazelate; epoxidized butyl esters of linseed oil fatty acids; epoxidized linseed oil; white mineral oil; hydrogenated polybutene; polyisobutylene; polypropylene glycol; propylene glycol azelate; and triethylene glycol; and wherein the vinyl chloride homo- and/or copolymers are devoid of phthalate plasticizer.

23. The method of claim 13, wherein the electrical cable further comprises EMI or RFI shielding.

24. The method of claim 13, further comprising providing chemical resistance to the electrical cable from cleaning solutions, disinfecting solutions, and sanitizing solutions.

* * * * *